United States Patent Office 2,824,128
Patented Feb. 18, 1958

2,824,128

PREPARATION OF PHENOLIC ETHYLENEDI-
AMINEPOLYCARBOXYLIC ACIDS

Martin Dexter, Cranston, R. I., assignor to Geigy Chemical Corporation, New York, N. Y., a corporation of Delaware No Drawing. Application February 3, 1956
Serial No. 563,183

3 Claims. (Cl. 260—519)

This invention relates to a novel and versatile procedure for the manufacture of organic compounds—ethylene-bis-(α-imino-o-hydroxyphenylacetic acid) and derivatives—that are capable of chelating polyvalent metal ions in neutral and alkaline solutions. Extensive field trials have shown that these compounds are remarkably effective in the correction of iron chlorosis in plants growing in alkaline soils. With the use of these chelating agents increased crop yields can be obtained and submarginal agricultural areas restored to greater productivity. It has also been shown that chelating agents in wide use such as ethylenediamine tetraacetic acid and hydroxyethylethylenediaminetriacetic acid are relatively ineffective.

One of the major deterrents to the widespread use of these compounds in combating trace metal deficiencies in agriculture has been the expensive method of manufacture. Despite their effectiveness they could be used to economic advantage only on high priced crops.

Their synthesis, as heretofore practiced, can be summarized as follows:

Two moles of salicylaldehyde (or a derivative of salicylaldehyde) is reacted with one mol of ethylenediamine to yield a Schiff base. The Schiff base is then reacted with two moles of hydrogen cyanide to give a dinitrile. Con-

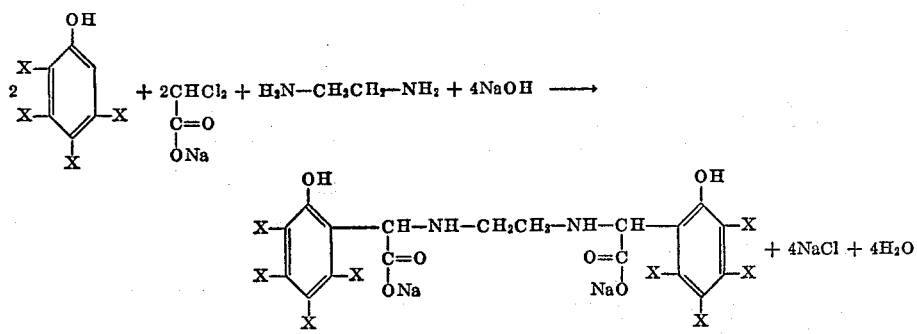

centrated hydrochloric acid is then used to hydrolyze the nitrile and to yield the dihydrochloride of the desired product.

The high price of salicylaldehyde, the number of chemical manipulations necessary and low overall yield contribute to making these products expensive.

A primary object of the present invention is the embodiment of a synthesis which is free of the afore-enumerated defects. According to the present invention, the said chelating agents can be prepared by a one-step reaction from readily available intermediates, whereby the aforesaid object is realized. Thus, sodium glyoxylate, ethylenediamine, and phenol (or a substituted phenol) are reacted to yield a solution of the desired product, according to the following reaction scheme:

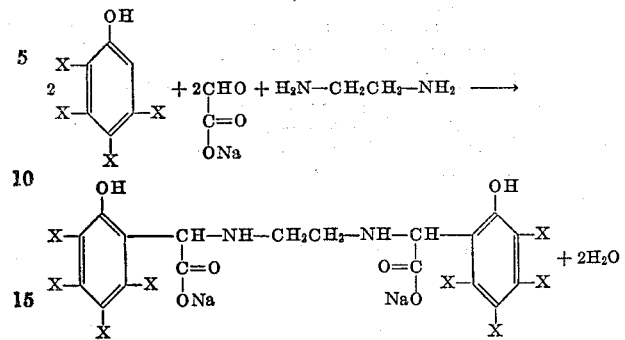

(I)

wherein X may be hydrogen, halogen, sulfonic acid, carboxyl, hydroxyl or alkyl.

The reaction is advantageously carried out at a temperature between 70° and 100° C. and at a pH between 8 and 10. A water-miscible solvent such as methyl, ethyl or isopropyl alcohol may be used to enhance the solubility of some of the substituted phenols in the reaction mixture.

In most cases the desired chelating agent can be precipitated from solution by acidification of the reaction mixture to a pH between 4 and 5. It is usually desirable to remove unreacted phenolic compounds by solvent extraction or steam distillation prior to precipitation.

It is possible to use sodium dichloroacetate in place of sodium glyoxylate in the above synthesis. In this case it is necessary, however, to add two moles of base for each mole of sodium dichloroacetate used in order to maintain the desired degree of alkalinity during the reaction.

The overall reaction using sodium dichloroacetate may be written as follows:

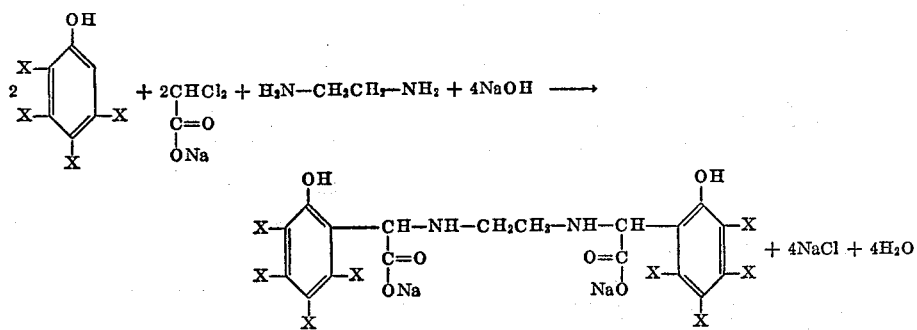

(II)

Examination of Equations I and II shows that identical chelating agents are produced in both reactions.

Representative presently-preferred embodiments of the present invention are set forth in the following illustrative examples wherein, unless otherwise indicated, the parts and percentages are by weight. The relationship between parts by volume and parts by weight is the same as that between milliliters and grams.

EXAMPLE 1

*Ethylene-bis-(α-imino-2-hydroxy-3,5-dimethylphenyl-acetic acid)*

To a solution of 43 parts by volume of sodium glyoxylate, containing 9.8 parts of 100% material, is added 3.5 parts of 86.8% ethylenediamine, 12.2 parts of 4-hydroxyl-1,3-dimethylbenzene and 50 parts by volume of methanol. The mixture is heated for 7 hours at 70° C. The pH is maintained at 8.5 by the dropwise addition of 2 parts of 50% aqueous sodium hydroxide solution during the reaction.

Unreacted dimethylphenol is extracted with ethyl ether after cooling to room temperature (about 20° to 30° C.) and diluting with 50 parts by volume of water. The product—ethylene - bis - (α - imino - 2 - hydroxy - 3,5-dimethylphenylacetic acid)—is precipitated by acidification to pH 4.5 with dilute HCl, filtered from solution, and washed successively with water and acetone. The yield after drying is 13 parts or 62.5% of theory.

Electrometric titration with perchloric acid in acetic acid solution gives a neutral equivalent of 199. The theoretical value is 208. The iron chelate is bluish red.

EXAMPLE 2

*Ethylene-bis-(α-imino-2-hydroxy-5-methylphenylacetic acid)*

The reaction is caried out as in Example 1 except that 21.6 parts of p-cresol are used instead of the 4-hydroxy-1,3-dimethylbenzene.

The yield—ethylene-bis-(α-imino-2-hydroxy-5-methylphenylacetic acid)—is 12.4 parts; 64% of theory. Neutral equivalent (determined as in Example 1, last paragraph) 188.5; calculated 194.

EXAMPLE 3

*Ethylene-bis-(α-imino-2-hydroxy-3,5-dimethylphenylacetic acid)*

To a reaction vessel equipped with thermometer, glass and calomel electrodes, agitator, and reflux condenser are added 52.5 parts of dichloroacetic acid and 25 parts of water. The dichloroacetic acid is neutralized by the addition of 69 parts by volume of 6.2 N aqueous sodium hydroxide solution. External cooling is used to keep the temperature below 35° C. To this solution is then added 86.4 parts of p-cresol, 50 parts by volume of methanol and 13.9 parts of an 87% aqueous solution of ethylenediamine.

The temperature is raised to approximately 90° C. and held at that temperature for 3 hours and 15 minutes. During the reaction 6.2 N aqueous sodium hydroxide solution is added to maintain a pH of 9.5. The mixture is then cooled and the pH lowered to 4.2 by the addition of 6 N hydrochloric acid. The product—ethylene-bis-(α-imino-2-hydroxy-3,5-dimethylphenylacetic acid)—is filtered, washed thoroughly with acetone and water and dried at 100° C. The yield is 41 parts, 53% of theory. The neutral equivalent, determined as in Example 1, is 182. Calc. value 194.

EXAMPLE 4

*Ethylene-bis-(α-imino-2-hydroxy-5-chlorophenylacetic acid)*

A solution of 51.5 parts of dichloroacetic acid in 25 parts by volume of water is neutralized with 68 parts by volume of 6 N aqueous sodium hydroxide solution. Seventy-seven parts of p-chlorophenol, 40 parts by volume of methanol and 12.1 parts of ethylenediamine are added and the mixture heated at 90° C. for 4 hours. 202 parts by volume of 6 N aqueous sodium hydroxide solution are added during the reaction period to maintain the pH at 9.5.

The mixture is acidified to a pH of 4 with 6 N hydrochloric acid. An oily precipitate forms. The aqueous phase is decanted and methanol added to the oil. The crystalline material that forms is filtered and washed with methanol and water, and dried.

The yield is 32.0 parts or 37.3% of theory. The neutral equivalent, determined as in Example 1, of the product—ethylene-bis-(α-imino - 2 - hydroxy - 5 - chlorophenylacetic acid)—is 229. The calculated value is 214.5.

EXAMPLE 5

*Ethylene-bis-(α-imino-2-hydroxy-5-tertiary-butylphenylacetic acid)*

A solution of 52.5 parts of dichloroacetic acid and 25 parts by volume of water is neutralized with 32 parts by volume of 6 N aqueous sodium hydroxide solution. To this mixture is added 75 parts of p-tertiary-butylphenol, 13.9 parts of 87% ethylenediamine and 160 parts by volume of methanol. The mixture is heated at 85° C. for seven hours. During the reaction 195 parts by volume of 6 N aqueous sodium hydroxide solution is added to maintain a pH of 9.5.

Methanol is removed from the reaction mixture by distillation until the vapor temperature reaches 100° C. After cooling to 30° C., the mixture is extracted with several portions of ethyl ether to remove unreacted p-tertiary-butylphenol. The product—ethylene-bis-(α-imino-2-hydroxy-5-tertiary-butylphenylacetic acid)—is precipitated from the aqueous phase by acidification with 6 N hydrochloric acid, filtered, washed successively with water and acetone, and dried at 100° C.

The yield is 63.5 parts; 67.3% of theory. The neutral equivalent by non-aqueous titration with perchloric acid is 213; calculated 236.

EXAMPLE 6

*Ethylene-bis-(α-imino-2-hydroxy-5-sulfonic phenylacetic acid)*

To a reaction flask are added 232 parts of a 45% aqueous solution of phenol sulfonic acid and 51.5 parts of dichloroacetic acid. Approximately 196 parts by volume of 6.2 N aqueous sodium hydroxide solution is used to raise the pH of the solution to 7. External cooling is used during the neutralization. 13.9 parts of ethylenediamine (87%) is then added and the mixture heated at 90° C. for 5 hours. 170 parts by volume of 6.2 N aqueous sodium hydroxide solution is used to maintain the pH at 9.5. An assay of the solution by determining its ability to chelate ferric iron shows a yield of product—ethylene-bis-(α-imino-2-hydroxy-5 - sulfonic - phenylacetic acid)—of 69%.

EXAMPLE 7

*Ethylene-bis-(α-imino-2-hyldroxyphenylacetic acid)*

The reaction is carried out in a manner similar to that of Example 1 except that 10.3 parts of phenol are used in place of 12.2 parts of 4-hydroxy-1,3-dimethylbenzene.

The yield is 10 parts, 55.5% of theory. The neutral equivalent by perchloric acid titration is 186; calculated 180.

The product—ethylene-bis-(α-imino-2-hydroxy-phenylacetic acid)—forms a red complex with iron.

EXAMPLE 8

*Ethylene-bis-(α-imino-2-hydroxy-5-carboxyphenylacetic acid)*

A mixture of 110.5 parts of p-hydroxybenzoic acid, 50 parts by volume of water and 105 parts of dichloroacetic acid is neutralized with 268 parts by volume of 5.9 N aqueous sodium hydroxide. External cooling is used to keep the temperature of the reaction mixture below 35° C. 27.7 parts of 86.8% ethylenediamine are added and the temperature raised to 95–100° C. and maintained at that temperature for 3½ hours. 6 N aqueous sodium hydroxide solution is added during the reaction to maintain the pH at 9.5.

The mixture is cooled to room temperature and acidified to a pH of 4 with 6 N hydrochloric acid. The resultant precipiate is filtered and washed with water and acetone, Yield of ethylene-bis-(α-imino-2-hydroxy-5-carboxyphenylacetic acid)=101 parts. Neutral equivalent by perchloric-acetic acid titration is 231; calculated 224.

EXAMPLE 9

*Ethylene-bis-(α-imino-2-hydroxy-5-octylphenylacetic acid)*

To a reaction vessel equipped with a thermometer, glass and calomel electrodes, agitator and reflux condenser are added 52.5 parts of dichloroacetic acid and 25 parts of water. The dichloroacetic acid is neutralized by the addition of 65 parts by volume of 6 N aqueous sodium hydroxide solution. External cooling is used to prevent the temperature from exceeding 50° C. To this solution are added 14 parts of 86% ethylenediamine. The temperature of the reaction mixture is raised to 85° C. and the pH is maintained at 10 by the addition of 64 parts of 50% aqueous sodium hydroxide solution. The time for this reaction is about one hour. To the reaction mixture is added 82.5 parts of octylphenol and 300 parts by volume of methanol. The condensation is carried out by heating for 17 hours at 75° C.

Methanol is distilled from the reaction mixture until the internal temperature rises to 85° C. The crude product is acidified to pH 4 by the addition of 40 parts of 6 N hydrochloric acid. After cooling, the supernatant liquors are decanted and the product granulated by the addition of acetone.

The yield of dry material—ethylene-bis-(α-imino-2-hydroxy-5-octylphenylacetic acid)—is 97.5 parts.

The neutral equivalent by titration with perchloric acid in acetic acid is 253. The calculated value is 292. The product forms a red-purple colored iron complex.

The effectiveness of the chelating agents of the present invention in making iron available to plants is illustrated in the following comparative runs, using calcareous Utah soil. The pH of this soil was 7.8. Lima bean seeds planted in pint containers were treated with 10 ml. of a solution containing 5 mg. of radioactive iron and an equivalent quantity of chelating agent. The $Fe^{59}$ content of the iron was equivalent to 5 microcuries. The lima bean plants were allowed to grow until the second trifoliate leaves appeared. They were then harvested and examined for radioactivity by means of a scintillation counter. The amount of radioactivity is a direct measure of the iron uptake of the plant. The following table shows the relative amounts of iron uptake as indicated by the level of radioactivity:

Chelating agent:
- (a) None (control) _____ 1
- (b) Ethylenediamine tetraacetic acid _____ 1
- (c) Versenol (hydroxyethyl ethylenediaminetriacetic acid) _____ 2.15
- (d) Ethylene-bis - (α-imino-2-hydroxy-5-methylphenylacetic acid) _____ 40.7

The foregoing demonstrates that in an alkaline soil, a representative phenolic ethylenediamine polycarboxylic acid of the present invention is many times as effective as the best chelating agents now commonly used for treatment of iron chlorosis.

Having thus disclosed the invention, what is claimed is:

1. A process for the preparation of an ethylene-bis-(α-imino-hydroxyphenylacetic acid), which comprises reacting, at a temperature between about 70° and about 100° C. and at a pH between about 8 and about 10, a compound of the formula

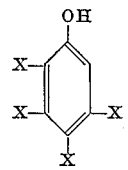

wherein X is selected from the group consisting of H, alkyl, chlorine, carboxyl and sulfo, with ethylenediamine and with a member selected from the group consisting of sodium glyoxylate and sodium dichloroacetate.

2. A process for the preparation of an ethylene-bis-(α-imino-hydroxyphenylacetic acid), which comprises reacting, at a temperature between about 70° and about 100° C. and at a pH between about 8 and about 10, a compound of the formula

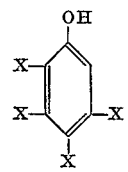

wherein X is selected from the group consisting of H, alkyl, chlorine, carboxyl and sulfo, with ethylenediamine and with sodium glyoxylate.

3. A process for the preparation of an ethylene-bis-(α-imino-hydroxyphenylacetic acid), which comprises reacting, at a temperature between about 70° and about 100° C. and at a pH between about 8 and about 10, a compound of the formula

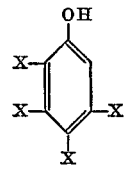

wherein X is selected from the group consisting of H, alkyl, chlorine, carboxyl and sulfo, with ethylenediamine and with sodium dichloroacetate.

No references cited.